(12) United States Patent
Pietrasz et al.

(10) Patent No.: US 12,537,216 B2
(45) Date of Patent: Jan. 27, 2026

(54) MULTI-LAYER ALL SOLID-STATE BATTERY COATING

(71) Applicant: FORD GLOBAL TECHNOLOGIES, LLC, Dearborn, MI (US)

(72) Inventors: Patrick Pietrasz, Rochester, NY (US); Gunho Kwak, Novi, MI (US); Chi Paik, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 703 days.

(21) Appl. No.: 17/889,547

(22) Filed: Aug. 17, 2022

(65) Prior Publication Data
US 2024/0063419 A1 Feb. 22, 2024

(51) Int. Cl.
| | |
|---|---|
| *B05C 5/02* | (2006.01) |
| *B05C 9/12* | (2006.01) |
| *H01M 4/04* | (2006.01) |
| *H01M 4/139* | (2010.01) |
| *H01M 10/04* | (2006.01) |
| *H01M 10/0562* | (2010.01) |
| *H01M 10/0585* | (2010.01) |

(52) U.S. Cl.
CPC ....... *H01M 10/0404* (2013.01); *B05C 5/0245* (2013.01); *B05C 9/12* (2013.01); *H01M 4/0404* (2013.01); *H01M 4/0407* (2013.01); *H01M 4/0435* (2013.01); *H01M 4/139* (2013.01); *H01M 10/0562* (2013.01); *H01M 10/0585* (2013.01)

(58) Field of Classification Search
None
See application file for complete search history.

(56) References Cited

U.S. PATENT DOCUMENTS

| | | |
|---|---|---|
| 9,627,709 B2 | 4/2017 | Sastry et al. |
| 9,634,358 B2 | 4/2017 | Matsushita |
| 9,923,231 B2 | 3/2018 | Geier et al. |
| 10,084,168 B2 | 9/2018 | Johnson et al. |
| 10,707,522 B2 | 7/2020 | Anandan et al. |
| 11,069,920 B2 | 7/2021 | Anandan et al. |
| 11,276,886 B2 | 3/2022 | Herle et al. |

(Continued)

FOREIGN PATENT DOCUMENTS

CN 111952661 A 11/2020

*Primary Examiner* — Binu Thomas
(74) *Attorney, Agent, or Firm* — Brooks Kushman P.C.; David B. Kelley (57) ABSTRACT

A coating system for a solid-state battery includes a feeder for a first substrate foil, and an electrolyte dispenser between two electrode dispensers. The first electrode dispenser has a first mixture of a first solid active material and a first solid electrolyte therein, and deposits a first electrode layer on the foil. The electrolyte dispenser deposits an electrolyte layer on the first electrode layer. The second electrode dispenser has a second mixture of second solid active material and a second solid electrolyte, and deposits a second electrode layer on the electrolyte layer. A roller provides a second substrate foil downstream of the second electrode dispenser on the second electrode layer to form a layered structure. The system also includes drums for press rolling the layered structure to form a solid-state battery, with the layers being continuously deposited.

20 Claims, 5 Drawing Sheets

(56) References Cited

U.S. PATENT DOCUMENTS

| | | | |
|---|---|---|---|
| 2014/0099556 A1* | 4/2014 | Johnson | H01M 10/0562 |
| | | | 429/231.95 |
| 2017/0207482 A1* | 7/2017 | Tomura | H01M 10/0562 |
| 2019/0013542 A1* | 1/2019 | Otaki | H01M 10/0562 |
| 2021/0126282 A1* | 4/2021 | Ose | H01M 10/0562 |
| 2022/0069342 A1* | 3/2022 | Yamamoto | H01M 10/0562 |
| 2024/0021894 A1* | 1/2024 | Kawashima | H01M 10/0562 |

* cited by examiner

MULTI-LAYER ALL SOLID-STATE BATTERY COATING

TECHNICAL FIELD

The present disclosure is related to coatings and fabrication methods for all solid-state batteries.

BACKGROUND

Advanced battery concepts, such as all solid-state systems, present an alternative to lithium-ion batteries. Typical solid-state batteries include an anode with a solid electrolyte, a solid electrolyte separator, and a cathode with a solid electrolyte. The manufacturing process for the solid-state batteries includes expensive processes such as physical vapor deposition or electron beam deposition, or mechanical adhesion of each layer individually to another layer. The planar geometry may give rise to interfacial resistance challenges when manufacturing the cell via these processes. As such, processes for assembling the cell may reduce interfacial resistance in all solid-state battery systems.

SUMMARY

According to one or more embodiments, a coating system for a solid-state battery includes a feeder providing a first substrate foil; a first electrode dispenser downstream of the feeder; an electrolyte dispenser downstream of the first electrode dispenser; and a second electrode dispenser downstream of the electrolyte dispenser. The first electrode dispenser has a first mixture of a first solid active material and a first solid electrolyte therein, the first dispenser depositing a first electrode layer on the foil. The electrolyte dispenser has a second solid electrolyte therein, the electrolyte dispenser depositing an electrolyte layer on the first electrode layer. The second electrode dispenser has a second mixture of a second solid active material and a third solid electrolyte therein, the second electrode dispenser depositing a second electrode layer on the electrolyte layer. The system also includes a roller providing a second substrate foil downstream of the second electrode dispenser on the second electrode layer to form a layered structure, and drums for press rolling the layered structure to form a solid-state battery. The first electrode dispenser, electrolyte dispenser, and second electrode dispenser continuously and consecutively deposit the first electrode layer, the electrolyte layer, and the second electrode layer.

According to one or more embodiments, a coating system for a solid-state battery includes a feeder providing a first substrate foil; an anolyte dispenser downstream of the feeder, an electrolyte dispenser downstream of the feeder, and a catholyte dispenser downstream of the feeder. The anolyte dispenser has a first mixture of anode active material and anode solid electrolyte therein, the anolyte dispenser depositing an anolyte layer on the foil. The electrolyte dispenser has a solid electrolyte material therein, the electrolyte dispenser depositing an electrolyte layer on the anolyte layer. The catholyte dispenser has a second mixture of cathode active material and a cathode solid electrolyte therein, the catholyte dispenser depositing a catholyte layer on the electrolyte layer. The system also includes a roller providing a second substrate foil downstream of the anolyte dispenser, electrolyte dispenser, and catholyte dispenser; and drums for press rolling the anolyte layer, electrolyte layer, catholyte layer between the first and second substrate foils. The anolyte dispenser, electrolyte dispenser, and catholyte dispenser continuously deposit the anolyte layer, electrolyte layer, and catholyte layer, respectively.

According to one or more embodiments, a method of producing an all-solid-state battery includes providing a first substrate foil, the substrate foil comprising a first surface; depositing a first electrode layer on the first surface layer, the first electrode layer including a first solid active material and a first solid electrolyte material; depositing an electrolyte layer on the first electrode layer, the electrolyte layer including a second solid electrolyte material; and depositing a second electrode layer on the electrolyte layer, the second electrode layer including a second solid active material and a third solid electrolyte material. The method also includes providing a second substrate foil on the second electrode layer to form a layered structure; and press-rolling the layered structure to form a solid-state cell.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in this disclosure are to be understood as modified by the word "about" in describing the broader scope of this disclosure. Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred. Furthermore, the term "substantially" may be used herein to describe aspects of the present disclosure. The term "substantially" may modify a value or relative characteristic disclosed and may signify that the value or relative characteristic it modifies is within ±0%, 0.1%, 0.5%, 1%, 2%, 3%, 4%, 5%, or 10% of the value or relative characteristic. Any value or relative characteristic provided herein may be modified by "substantially" whether or not explicitly noted.

The structure of all solid-state batteries (ASSBs) includes electrodes (i.e., an anode and a cathode) and a solid electrolyte separator therebetween. During charging and discharging of the ASSB, ions are deposited and stripped, respectively, at the anode surface based on the interfacial area therebetween. The geometry of ASSBs is generally planar, with layers of each of the anode material, separator material, and cathode material, being stacked together to form the interfacial area of contact between the electrodes and the solid electrolyte. Interfacial resistance may limit the current density, and as such, limiting interfacial resistance is desired.

According to one or more embodiments, an assembly process and method that minimizes movement of the layers and transferring layers to additional stations is provided. Furthermore, the process and method employs direct application of the layers to reduce interfacial resistance in the ASSB.

Figure 1:
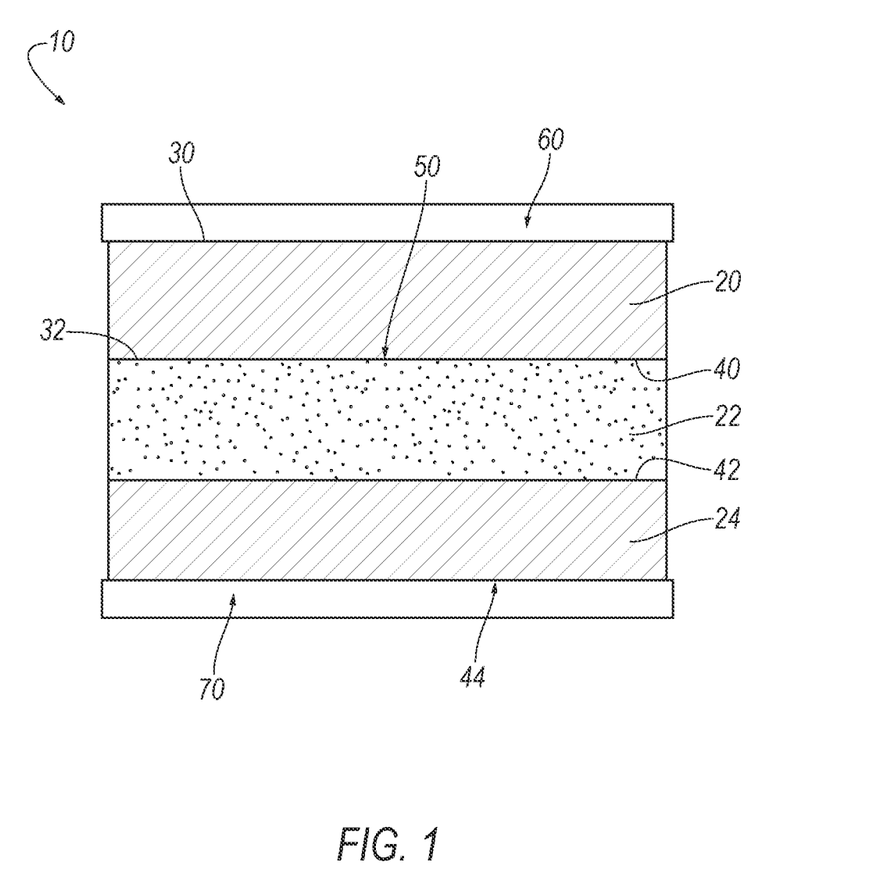
FIG. 1 is a cross-sectional view of a solid-state battery.

Referring to FIG. 1, an example ASSB cell 10 is shown. The ASSB cell 10 may be provided as a component of a vehicle powertrain, and include an electrode 20 (hereinafter interchangeably, anode 20), a solid electrolyte separator 22, and a cathode 24. The solid electrolyte separator 22 is sandwiched between the anode 20 and cathode 24.

The electrode 20 is the anode of the ASSB 10, and may be made of a metal or metal alloy of lithium, sodium, magnesium, aluminum, etc. For example, the electrode 20 may be made of lithium metal or a lithium metal alloy. The electrode 20 may also include a solid electrolyte material to facilitate conduction through the thickness of the electrode 20. Collectively, the combination of the metal or metal alloy and solid electrolyte for the electrode 20 may be hereinafter referred to as the anolyte. The electrode 20 may have first electrode surface 30 and a second electrode surface 32, opposite to the first electrode surface. The second electrode surface 32 may be disposed proximate to the solid electrolyte 22. The electrode 20 may have any suitable thickness as based on the deposition of the layer.

The solid electrolyte separator 22 may be a ceramic electrolyte, such as an electrolyte made of an oxide-based electrolyte such as lithium lanthanum zirconium oxide (LLZO), lithium phosphorus oxynitride (LiPON), LATP, LiSICON, or the like. The solid electrolyte separator 22 may be made of a sulfide based electrolyte such as $Li_{10}GeP_2S_{12}$, $Li_2S-P_2S_5$, or the like for $Li^+$ conduction, a clay and β-alumina group of compounds ($NaAl_{11}O_{17}$) for $Na^+$ conduction and other mono- and divalent ions. The solid electrolyte separator 22 may have any suitable thickness as based on the deposition of the layer. The solid electrolyte material of the electrode 20 may be the same or similar material to the solid electrolyte 22, or may be a different solid electrolyte material.

The solid electrolyte separator 22 may have a first solid electrolyte separator surface 40 and a second solid electrolyte separator surface 42, opposite to the first solid electrolyte separator surface. The first solid electrolyte separator surface 40 may abut against or engage the second electrode surface 32 such that it is in contact with the electrode 20 to have an interface 50 therebetween. The second solid electrolyte separator surface 42 may abut against or engage the cathode 24, such that it is in contact with the cathode 24 to have an interface therebetween.

The cathode 24 may be made of any suitable material, such as, but not limited to, transition metal oxides such as lithium iron phosphate, lithium cobalt oxide, lithium nickel cobalt oxide, or lithium manganese oxide. The cathode 24 may also include a solid electrolyte material to facilitate conduction through the thickness of the cathode 24. Collectively, the combination of the cathode material and solid electrolyte for the cathode 24 may be hereinafter referred to as the catholyte. The cathode 24 may have first cathode surface 42 and a second cathode surface 44, opposite to the first cathode surface 42. The first cathode surface 42 may be disposed proximate to the solid electrolyte 22. The cathode 24 may have any suitable thickness as based on the deposition of the layer. In at least one example, the cathode 24 may be made of sulfur material along with electronic and ionic conducting materials.

Referring again to FIG. 1, the ASSB cell 10 further includes current collectors 60, 70 contacting the anode 20 and the cathode 24, respectively. The anode current collector 60 has an anode current collector surface 62 which abuts and contacts the first electrode surface 30 of the anode 20. The cathode current collector 70 has a cathode current collector surface 72 which abuts and contacts the second cathode surface 44 of the cathode 24. The current collectors 60, 70 may be any suitable material for conducting current generated by the cell 10. For example, the current collectors 60, 70 may be a metal foil, such as, but not limited to, a copper or nickel foil.

Figure 2:
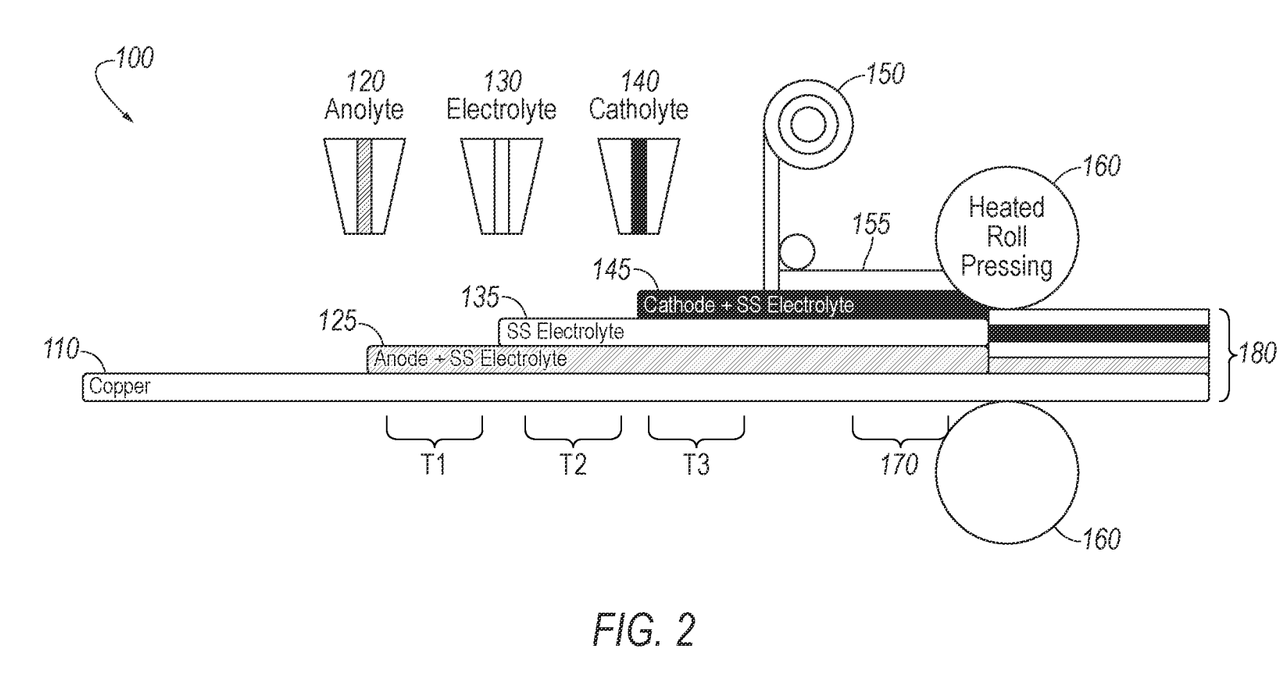
FIG. 2 is a schematic diagram of a process for forming a solid-state battery, according to an embodiment.
Figure 3:
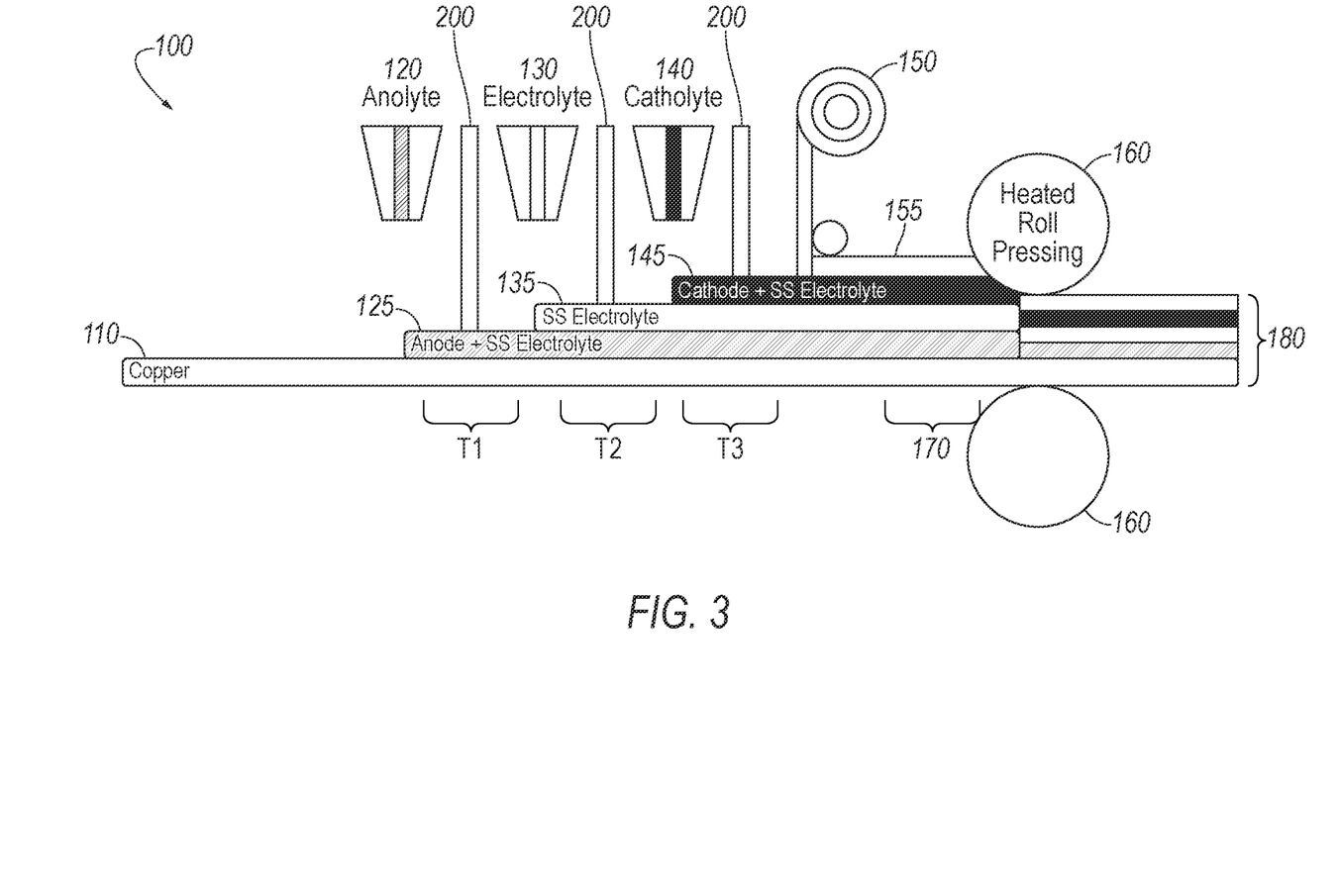
FIG. 3 is a schematic diagram of a process for forming a solid-state battery, according to another embodiment.

With reference to FIGS. 2-3, production systems, production processes, and methods for forming the cell 10 are provided. Generally, the production process of building an anode layer, solid state separator layer, and a cathode layer is provided via a coating system 100, 300 involving a process with continuous coating steps. For example, the coating system 100 may employ 3 continuous coating steps. The coating system 100 includes a substrate foil 110 provided to be coated. The substrate foil 110 may be any suitable metal foil for forming a current collector (e.g., current collectors 60, 70), such as, but not limited to, copper or nickel. Like numerals are used for like components across the Figures.

Referring to FIG. 2, the coating system 100 includes separate dispensers for each component for each of the continuous coating steps. Although the dispensers may be hereinafter referred to as specifically an anolyte/anode or catholyte/cathode dispenser, this is not intended to be limiting, and these dispensers are interchangeable as a first electrode dispenser and a second electrode dispenser as based on the desired order of construction (and current collector foil provided).

With reference to FIG. 2, the anolyte dispenser 120 (i.e., the first electrode dispenser) includes a mixture of the anode active material and the solid-state electrolyte material (i.e., the anolyte) therein for forming the anode 20. The electrolyte dispenser 130 is downstream of the anolyte dispenser, and includes the solid-state electrolyte material for forming the solid electrolyte separator 22. The catholyte dispenser 140 (i.e., the second electrode dispenser) is downstream of the electrolyte dispenser, and includes a mixture of the cathode active material and the solid-state electrolyte material (i.e., the catholyte) therein for forming the cathode 24. The anolyte dispenser 120, electrolyte dispenser 130, and catholyte dispenser 140 (hereinafter, collectively, the dispenser heads 120, 130, 140) are separate heads each having a respective nozzle (not shown) for dispensing the anolyte, electrolyte, and catholyte, respectively, consecutively onto the substrate foil 110. The dispenser heads 120, 130, 140 may be spaced apart according to the speed of movement of the substrate foil 110 through the coating process such that each layer deposited on the foil 110 has a predetermined time before the next layer is coated thereon. As such, the anolyte dispenser 120 deposits the anode layer 125 on the foil 110, with the anode active material and solid electrolyte which forms the anode 20. Upon deposition, the anolyte layer is on the line for T1 (where regulation may take place by a coating regulator 200 as discussed hereinafter). The electrolyte dispenser 130 then deposits the solid electrolyte layer 135 on the anode layer 125 which forms the solid electrolyte separator 22. The electrolyte layer 135 may be deposited after T1, and be on the line for T2 (where regulation may similarly take place). Upon the solid electrolyte layer 135 being deposited, the catholyte dispenser 140 deposits the cathode layer 135, with the cathode active material and solid electrolyte, on the solid electrolyte layer 135 after T2 which forms the cathode 24. Upon deposition, the catholyte layer is on the line for T3 (where regulation may similarly take place). A roller 150 provides another substrate foil 160 for forming the other current collector on the cathode layer 145 to form a layered composite 170 (e.g., if the anode current collector 60 is provided to the coater for deposition thereon, the cathode current collector 70 is provided by the roller after the layers are deposited). For example, the roller 150 may provide a substrate foil layer 155, such as, but not limited to, aluminum or nickel, on the cathode layer 145. The coating system 100 further includes heated drums 160 for roll pressing the layered composite 170 to form the cell sheet 180 such that the interfacial resistance between the layers can be improved via continuous deposition and subsequent heat roll pressing by the drums 160.

In certain embodiments, as shown in FIG. 3, the coating system 100 may further include coating regulator(s) 200 in between the dispensers 120, 130, 140 to control the thickness and smoothness of each layer 125, 135, 145, respectively. The coating regulator(s) 200 may be a bar, blade, or other suitable mechanism for controlling the thickness and smoothness of each layer during or after deposition. As such the coating regulator(s) may be a component of the dispenser heads 120, 130, 140, or may be a separate component between the dispenser heads 120, 130, 140. In some embodiments, the coating regulator(s) 200 also include localized suction to control the residual scraps and/or heaters if local heating is required between deposition of layers. Although shown as the same type of coating regulator 200, any combination of regulator types is contemplated.

Figure 4:
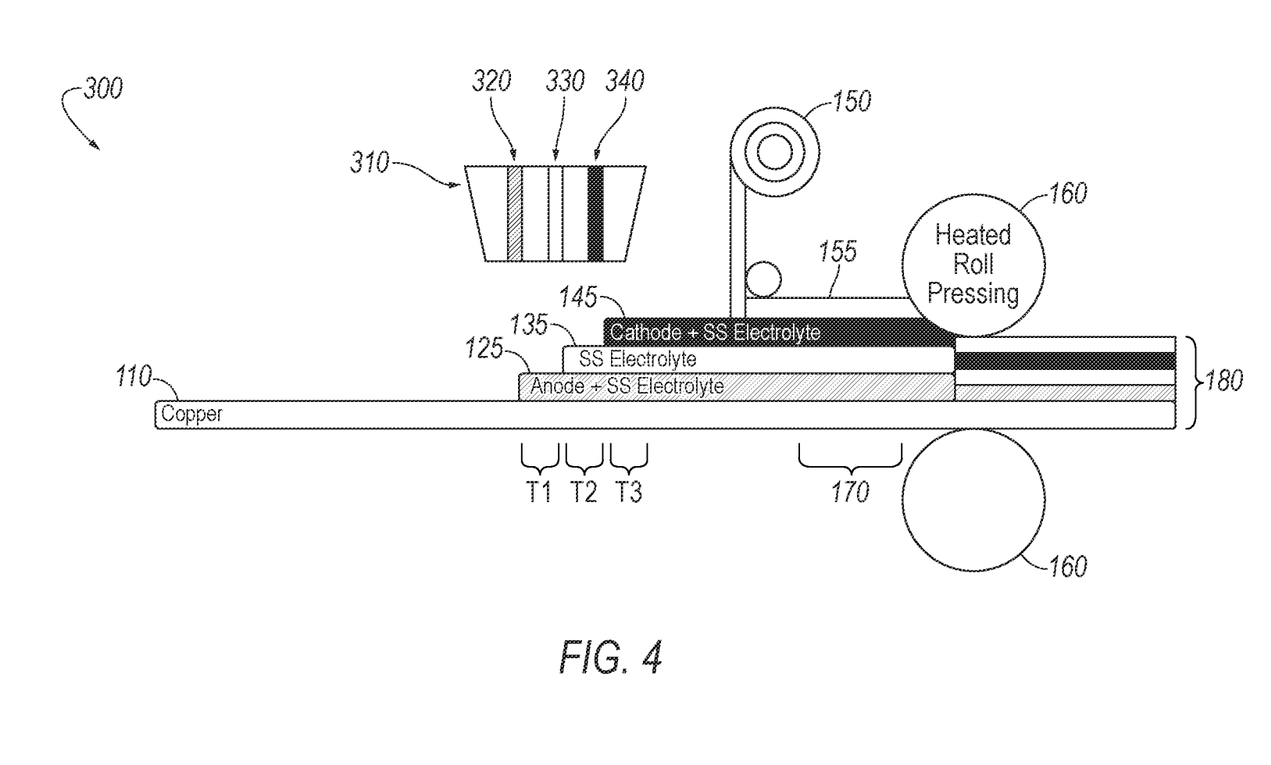
FIG. 4 is a schematic diagram of a process for forming a solid-state battery, according to yet another embodiment.

Referring to FIG. 4, a coating system 300 is shown, according to another embodiment. the coating system 100 includes a single dispenser head 310 with multiple nozzles for dispensing each component for each of the continuous coating steps. Although the nozzles may be hereinafter referred to as specifically an anolyte/anode or catholyte/cathode nozzles, this is not intended to be limiting, and these nozzles are interchangeable as a first electrode nozzle and a second electrode nozzle as based on the desired order of construction (and current collector foil provided). Moreover, the term nozzle is used to differentiate the embodiments where the dispenser is a single head (FIG. 4) rather than separate heads (FIGS. 2-3), and may be interchangeable referred to as dispensers as well.

The anolyte nozzle 320 (i.e., first electrode nozzle or dispenser) includes a mixture of the anode active material and the solid-state electrolyte material (i.e., the anolyte) therein for forming the anode 20. The electrolyte nozzle 330 is downstream of the anolyte nozzle, and includes the solid-state electrolyte material for forming the solid electrolyte separator 22. The catholyte nozzle 340 (i.e., second electrode nozzle or dispenser) is downstream of the electrolyte nozzle, and includes a mixture of the cathode active material and the solid-state electrolyte material (i.e., the catholyte) therein for forming the cathode 24. The anolyte nozzle 320, electrolyte nozzle 330, and catholyte nozzle 340 (hereinafter, collectively, the dispenser nozzles 320, 330, 340) are separate nozzles in a single dispenser head 310 for dispensing the anolyte, electrolyte, and catholyte, respectively, consecutively onto the substrate foil 110. The nozzles 320, 330, 340 may be spaced apart in the dispenser head 310 according to the speed of movement of the substrate foil 110 through the coating process such that each layer deposited on the foil 110 has a predetermined time (T1, T2, or T3) before the next layer is coated thereon. As such, the anolyte nozzle 320 deposits the anode layer 125 on the foil 110, with the anode active material and solid electrolyte which forms the anode 20. Upon deposition, the anode layer is on the line for T1 (where regulation may take place as previously described). The electrolyte nozzle 330 then deposits the solid electrolyte layer 135 on the anode layer 125 which forms the solid electrolyte separator 22 after T1. Upon deposition, the electrolyte layer is on the line for T2 (where regulation may similarly take place). Upon the solid electrolyte layer 135 being deposited and after T2, the catholyte nozzle 340 deposits the cathode layer 135, with the cathode active material and solid electrolyte, on the solid electrolyte layer 135 which forms the cathode 24. Upon deposition, the cathode layer is on the line for T3 (where regulation may similarly take place). The coating system 300 similarly includes a roller 150 providing another substrate foil 160 for forming the other current collector on the cathode layer 145 to form the layered composite 170 (e.g., if the anode current collector 60 is provided to the coater for deposition thereon, the cathode current collector 70 is provided by the roller after the layers are deposited). For example, the roller 150 may provide a substrate foil layer 155, such as, but not limited to, aluminum or nickel, on the cathode layer 145. The coating system 300 further includes heated drums 160 as previously described for roll pressing the layered composite 170 to form the cell sheet 180 such that the interfacial resistance between the layers can be improved via continuous deposition of the layers and subsequent heat roll pressing by the drums 160.

In certain embodiments, although not shown in FIG. 4, the coating system 300 may further include coating regulator(s) 200, as discussed with reference to FIG. 3. The coating regulator(s) may be in between the nozzles 320, 330, 340 to control the thickness and smoothness of each layer. In some embodiments, the coating regulator(s) 200 may also include localized suction to control the residual scraps and/or heaters if local heating is required between deposition of layers.

Although the order of deposition in FIGS. 2-4 is shown as anolyte, electrolyte, and then catholyte, this depiction is not intended to be limiting, and the continuous process of coating may be reversed such that the catholyte is deposited first, followed by the electrolyte, and then the anolyte thereafter. The substrate foils may be positioned accordingly in the process for forming the respective current collectors. As such, the process may be described as a first electrode layer (e.g., the anolyte), and a second electrode layer (e.g., the catholyte), and discussion of an anode deposition upstream of the cathode deposition is not intended to be limiting. Furthermore, although only three dispenser heads are shown for the layers discussed, additional layers may be included in the cell and deposited via additional dispensers and/or nozzles in the coating systems, and the discussion of particular layers is not intended to be limiting.

With reference to the coating systems 100, 300 as shown in FIGS. 2-4, each layer may undergo a predetermined regulation treatment after deposition (i.e., via the coating regulator(s) 200). The predetermined regulation treatment may be based on the thickness of the layer or collective layers. The predetermined regulated treatment may be any suitable treatment, such as, but not limited to, doctor blading, mild heating, and/or pressure folling. The predetermined regulation treatment may be performed by the regulator(s) or other suitable equipment (not shown). The timing of the treatment may be based on the type of regulation or thickness of the layer or layers deposited. Moreover, each dispenser head/nozzle may deposit a predetermined amount of material as based on the desired thickness and the treatment process is thereby determined based on the amount deposited for treating the layers before movement down the line and deposition of the next layer in the continuous process.

Figure 5:
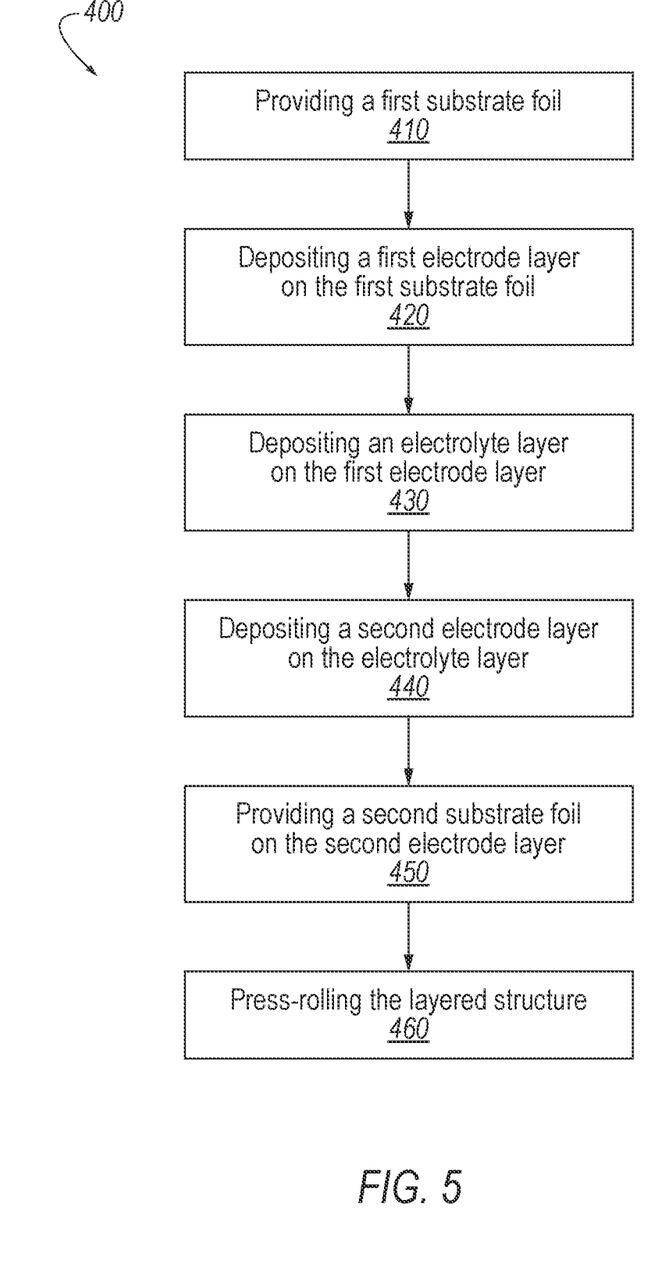
FIG. 5 is a flow chart of a method of forming a solid-state battery, according to an embodiment.

Referring to FIG. 5, a method 400 for forming a solid-state battery is provided. The method 400 includes, at step 410, providing a first substrate foil, the substrate foil comprising a first surface. The method 400 further includes, at step 420, depositing a first electrode layer on the first surface layer, the first electrode layer including a first solid active material and a first solid electrolyte material. At step 430, the method 400 includes depositing an electrolyte layer on the first electrode layer, the electrolyte layer including a second solid electrolyte material. At step 440, the method 400 further includes depositing a second electrode layer on the electrolyte layer, the second electrode layer including a second solid active material and a third solid electrolyte material. The method also includes, at step 450, providing a second substrate foil on the second electrode layer to form a layered structure. At step 460, the layered structure is press-rolled to form the solid-state cell. Further regulation steps may take place between the depositing steps based on a predetermined regulation treatment. The predetermined regulation treatment may be based on thickness of the layer or layers.

The coating systems and methods provided herein reduce the movement of layers between stations, and movement of layers for deposition of the next layer. Furthermore, the direct deposition allows for improved contact and coating of the electrolyte onto the electrode layers to reduce interfacial resistance in the solid-state battery. The process also allows for regulation of the layers in the continuous process. As such, a process with continuous deposition of the layers and production of the cell is provided.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A coating system for a solid-state battery comprising:
a feeder providing a first substrate foil;
a first electrode dispenser downstream of the feeder having a first mixture of a first solid active material and a first solid electrolyte therein, the first dispenser depositing a first electrode layer on the first substrate foil;
an electrolyte dispenser downstream of the first electrode dispenser having a second solid electrolyte therein, the electrolyte dispenser depositing an electrolyte layer on the first electrode layer;
a second electrode dispenser downstream of the electrolyte dispenser having a second mixture of a second solid active material and a third solid electrolyte therein, the second electrode dispenser depositing a second electrode layer on the electrolyte layer;
a roller providing a second substrate foil downstream of the second electrode dispenser on the second electrode layer to form a layered structure; and
drums for press rolling the layered structure to form a solid-state battery,
wherein the first electrode dispenser, electrolyte dispenser, and second electrode dispenser continuously and consecutively deposit the first electrode layer, the electrolyte layer, and the second electrode layer therebetween such that the layered structure is formed via continuous and consecutive deposition prior to press-rolling by the drums.

2. The coating system of claim 1, wherein the drums are heated for heated press rolling the layered structure.

3. The coating system of claim 1, wherein the first electrode dispenser, the electrolyte dispenser, and the second electrode dispenser are housed in a single dispenser head such that the first electrode dispenser is a first electrode nozzle in the single dispenser head, the electrolyte dispenser is an electrolyte nozzle in the single dispenser head, and the second electrode dispenser is a second electrode nozzle in the single dispenser head.

4. The coating system of claim 1, wherein the first electrode dispenser, the electrolyte dispenser, and the second electrode dispenser are separate dispenser heads for depositing the first electrode layer, the electrolyte layer, and the second electrode layer, respectively.

5. The coating system of claim 1, further comprising at least one coating regulator comprising a bar or blade downstream of the feeder and upstream of the roller.

6. The coating system of claim 5, further comprising a first coating regulator downstream of the first electrode dispenser and upstream of the electrolyte dispenser, the first coating regulator configured to perform a predetermined first electrode regulation treatment to the first electrode layer.

7. The coating system of claim 6, further comprising a second coating regulator comprising a bar or a blade downstream of the electrolyte dispenser and upstream of the second electrode dispenser, the second coating regulator configured to perform a predetermined electrolyte regulation treatment to the electrolyte layer.

8. The coating system of claim 7, further comprising a third coating regulator comprising a bar or a blade downstream of the second electrode dispenser and upstream of the roller, the third coating regulator configured to perform a predetermined second electrode regulation treatment to the second electrode layer.

9. The coating system of claim 5, further comprising a first coating regulator comprising a bar or a blade downstream of the first electrode dispenser and upstream of the electrolyte dispenser, the first coating regulator configured to perform a predetermined first electrode regulation treatment to the first electrode layer, and a second coating regulator comprising a bar or a blade downstream of the second electrode dispenser and upstream of the roller, the second coating regulator configured to perform a predetermined second electrode regulation treatment to the second electrode layer.

10. A coating system for a solid-state battery comprising:
a feeder providing a first substrate foil;
an anolyte dispenser downstream of the feeder having a first mixture of anode active material and anode solid electrolyte therein, the anolyte dispenser depositing an anolyte layer on the first substrate foil;

an electrolyte dispenser downstream of the feeder having a solid electrolyte material therein, the electrolyte dispenser depositing an electrolyte layer on the anolyte layer;
a catholyte dispenser downstream of the feeder having a second mixture of cathode active material and a cathode solid electrolyte therein, the catholyte dispenser depositing a catholyte layer on the electrolyte layer;
a roller providing a second substrate foil downstream of the anolyte dispenser, electrolyte dispenser, and catholyte dispenser to form a layered structure; and
drums for press rolling the layered structure,
wherein the anolyte dispenser, electrolyte dispenser, and catholyte dispenser continuously and consecutively deposit the anolyte layer, electrolyte layer, and catholyte layer, respectively, such that the layered structure is formed via continuous and consecutive deposition prior to roll pressing by the drums.

11. The coating system of claim 10, further comprising:
an anolyte regulator comprising a bar or a blade downstream of the anolyte dispenser configured to perform a predetermined anolyte layer regulation treatment to the anolyte layer; and
a catholyte regulator comprising a bar or a blade downstream of the catholyte dispenser configured to perform a predetermined catholyte layer regulation treatment to the catholyte layer.

12. The coating system of claim 11, wherein the predetermined anolyte layer regulation treatment and predetermined catholyte layer regulation treatment are each thickness-regulated.

13. The coating system of claim 11, further comprising:
an electrolyte regulator comprising a bar or a blade downstream of the anode dispenser configured to perform a predetermined electrolyte layer regulation treatment to the electrolyte layer.

14. The coating system of claim 10, wherein the anolyte dispenser is upstream of the catholyte dispenser.

15. A method of producing an all-solid-state battery comprising:
depositing a first electrode layer on a first surface layer of a first substrate foil, the first electrode layer including a first solid active material and a first solid electrolyte material;
depositing an electrolyte layer on the first electrode layer, the electrolyte layer including a second solid electrolyte material;
depositing a second electrode layer on the electrolyte layer, the second electrode layer including a second solid active material and a third solid electrolyte material;
disposing a second substrate foil on the second electrode layer to form a layered structure; and
press-rolling the layered structure to form a solid-state cell,
wherein the first electrode layer, the electrolyte layer, and the second electrode layer are continuously and consecutively deposited, respectively, such that the layered structure is formed via continuous and consecutive deposition prior to roll pressing by the drums.

16. The method of claim 15, further comprising performing a regulation treatment via a bar or a blade to one or more of the first electrode layer, the electrolyte layer, and the second electrode layer.

17. The method of claim 16, wherein the regulation treatment is based on a thickness of the one or more of the first electrode layer, the electrolyte layer, and the second electrode layer.

18. The method of claim 15, wherein the first electrode layer is an anolyte layer and the second electrode layer is a catholyte layer.

19. The method of claim 15, wherein the depositing is via a single dispenser head.

20. The method of claim 15, wherein the press-rolling is heated press-rolling.

* * * * *